(12) United States Patent
Schmidt et al.

(10) Patent No.: US 10,423,801 B2
(45) Date of Patent: Sep. 24, 2019

(54) DATA BOOKMARK DISTRIBUTION

(71) Applicant: Bouquet.ai, Inc., San Francisco, CA (US)

(72) Inventors: Adrien Paul Schmidt, San Rafael, CA (US); Marios Anapliotis, San Francisco, CA (US); Serge Fantino, Boulogne-Billancourt (FR)

(73) Assignee: Bouquet.ai, Inc., San Francisco, CA (US)

( * ) Notice: Subject to any disclaimer, the term of this patent is extended or adjusted under 35 U.S.C. 154(b) by 0 days.

(21) Appl. No.: 15/346,591

(22) Filed: Nov. 8, 2016

(65) Prior Publication Data
US 2018/0129816 A1 May 10, 2018

(51) Int. Cl.
*H04L 29/06* (2006.01)
*G06F 21/62* (2013.01)

(52) U.S. Cl.
CPC ...... *G06F 21/6218* (2013.01); *H04L 63/0272* (2013.01)

(58) Field of Classification Search
CPC .................. G06F 21/6218; H04L 63/0272
See application file for complete search history.

(56) References Cited

U.S. PATENT DOCUMENTS

| | | | |
|---|---|---|---|
| 5,642,503 A * | 6/1997 | Reiter ................. | G06F 16/2329 |
| 5,826,253 A * | 10/1998 | Bredenberg ........ | G06F 12/0815 |
| 5,918,224 A * | 6/1999 | Bredenberg ........ | G06F 12/0815 |
| 5,926,807 A * | 7/1999 | Peltonen ........... | G06F 17/30501 |
| 6,460,038 B1 | 10/2002 | Khan et al. | |
| 7,386,563 B1 * | 6/2008 | Pal ..................... | G06F 17/30336 |
| 9,811,590 B1 * | 11/2017 | Acharya ............. | G06F 17/3089 |
| 2003/0088422 A1 * | 5/2003 | Denenberg ............. | G10L 15/28 704/275 |
| 2006/0294039 A1 * | 12/2006 | Mekenkamp ..... | G06F 17/30079 |
| 2007/0013948 A1 * | 1/2007 | Bevan ................... | G06F 3/1214 358/1.15 |
| 2008/0082673 A1 | 4/2008 | Dynin et al. | |
| 2008/0172399 A1 * | 7/2008 | Chi ................... | G06F 17/30884 |
| 2009/0083278 A1 * | 3/2009 | Zhao ................. | G06F 17/30876 |
| 2012/0213496 A1 * | 8/2012 | Rothschild ......... | H04N 21/2402 386/326 |

(Continued)

OTHER PUBLICATIONS

International Search Report for International Patent Application No. PCT/US2017/059999, dated Jan. 24, 2018, 12 pages.

*Primary Examiner* — Sarah Su
(74) *Attorney, Agent, or Firm* — Morgan, Lewis & Bockius LLP

(57) ABSTRACT

Computer systems and methods are provided for distributing a data bookmark. An interface of a device that is secured in a private network receives a scope definition. The scope definition includes information that defines a scope of access to data that corresponds to data stored by one or more databases that are secured in the private network. A pointer is generated for the data bookmark. The data bookmark is generated using the pointer and the scope definition. A device that is secured in the private network stores the generated data bookmark. Information about the data bookmark, including the pointer for the data bookmark, is transmitted to at least one remote device at a remote location that is outside of the private network.

24 Claims, 9 Drawing Sheets

(56) References Cited

U.S. PATENT DOCUMENTS

| | | | |
|---|---|---|---|
| 2012/0331532 A1* | 12/2012 | Walters | H04L 12/66 726/5 |
| 2014/0019466 A1 | 1/2014 | Jeffery et al. | |
| 2014/0023340 A1* | 1/2014 | Civiletto | H04N 21/2181 386/239 |
| 2014/0068448 A1* | 3/2014 | Plost | G06F 9/451 715/738 |
| 2014/0365432 A1* | 12/2014 | Jain | G06F 17/30194 707/610 |
| 2015/0324598 A1* | 11/2015 | Shams | G06F 17/30884 707/781 |

\* cited by examiner

600

602
Receive, by an interface of a device that is secured in a private network, a scope definition, wherein the scope definition includes information that defines a scope of access to data that corresponds to data stored by one or more databases that are secured in the private network

604
The scope definition includes information that indicates a portion, less than all, of the data stored by the one or more databases

606
The scope definition includes one or more filters that are available to be applied to the portion, less than all, of the data stored by the one or more databases

608
The scope definition includes information that indicates at least one value determined by performing at least one operation on data stored by the one or more databases

610
Generate a pointer for the data bookmark

Figure 6A

Snippet 512

| | >customer >address Country | >inventory >film Title | COUNT rental |
|---|---|---|---|
| #1 | India | Retribution (2008) | 83 |
| #2 | India | Wasp-Man (2014) | 82 |
| #3 | India | Heavy Rain (1988) | 82 |
| #4 | India | The Raven (2012) | 81 |
| #5 | India | Beautiful Monsters (2014) | 80 |

Figure 7

DATA BOOKMARK DISTRIBUTION

TECHNICAL FIELD

The disclosed embodiments relate generally to a data analytics, and in particular, to distribution of access information for secure stored data.

BACKGROUND

Data security is a concern that drives the way businesses handle storage and distribution of information. Stored data may be protected by a firewall that provides access to particular data sources only via secure network connections. For example, a firewall may provide network security for a business premises such that a database located on the business premises is protected by the firewall.

While businesses must use security measures to protect data, it may also be desirable to provide limited access to users or applications that wish to utilize the protected data from beyond the firewall. For example, a business may benefit from providing a data analytics application with access to data from a protected database. Granting limited access to protected data would allow an off-site user, such as an employee or consultant, to provide data analytics services while maintaining data security.

SUMMARY

Without limiting the scope of the appended claims, after considering this disclosure, and particularly after considering the section entitled "Detailed Description," one will understand how the aspects of various embodiments are used to distribute data bookmarks.

There is a need for systems and methods for generating a data bookmark that includes information indicating a limited scope of access to one or more databases that are secured in a private network, and transmitting a link to the data bookmark and/or a preview of information that corresponds to the limited scope of access to a remote device that is outside of the private network. In this way, information about data that corresponds to the limited scope of access defined by a bookmark can be presented in an application accessed by a device that is outside of the secure private network, while sensitive data remains secure within the private network.

In some embodiments, a method for distributing a data bookmark includes receiving, by an interface of a device that is secured in a private network, a scope definition. The scope definition includes information that defines a scope of access to data that corresponds to data stored by one or more databases that are secured in the private network. The method includes generating a pointer for the data bookmark. The method further includes generating the data bookmark using the pointer and the scope definition. The method also includes storing, by the device that is secured in the private network, the generated data bookmark. The method additionally includes transmitting information about the data bookmark, including the pointer for the data bookmark, to at least one remote device at a remote location that is outside of the private network.

In some embodiments, a system for distributing a data bookmark includes one or more processors, memory, and one or more programs. The one or more programs are stored in the memory and configured to be executed by the one or more processors. The one or more programs include instructions for carrying out the following actions. There is received, by an interface of a device that is secured in a private network, a scope definition. The scope definition includes information that defines a scope of access to data that corresponds to data stored by one or more databases that are secured in the private network. A pointer is generated for the data bookmark. The data bookmark is generated using the pointer and the scope definition. The device that is secured in the private network stores the generated data bookmark. Information about the data bookmark, including the pointer for the data bookmark, is transmitted to at least one remote device at a remote location that is outside of the private network.

In some embodiments, a computer readable storage medium stores one or more programs. The one or more programs comprise instructions, which when executed, cause a device that is secured in a private network to carry out the following actions. There is received, by an interface of a device, a scope definition. The scope definition includes information that defines a scope of access to data that corresponds to data stored by one or more databases that are secured in the private network. A pointer for the data bookmark is generated. The data bookmark is generated using the pointer and the scope definition. A device that is secured in the private network stores the generated data bookmark. Information about the data bookmark, including the pointer for the data bookmark, is transmitted to at least one remote device at a remote location that is outside of the private network.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 6A-6C are flow diagrams illustrating a method for distributing a data bookmark, in accordance with some embodiments.

FIG. 7 is an example of a snippet 512 that corresponds to bookmark 500.

In accordance with common practice, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Data bookmarks as described herein allow users and applications within a data analytics system to receive links to bookmarks that define a limited scope of access to data stored in a database within a secure private network. The scope of access to data stored in the private network includes, e.g., the data stored in a database, data generated based on data stored in a database, and/or tools for organizing and analyzing data stored in a database. The bookmarks are stored and managed at a device that is within the private network. In this way, the information that is shared beyond a secure private network is limited (e.g., to a bookmark link and/or a snippet preview of a scope of data defined by a bookmark), while the bookmark definition and data beyond the defined scope of the bookmark remain inaccessible to the user. In some embodiments, the bookmark includes a security token for controlling access to the scope of data defined by the bookmark. In some embodiments, a bookmark is associated with a particular user or group of users, and user access parameters associated with the bookmark are used to limit access to the scope of data defined by the bookmark.

Figure 1:
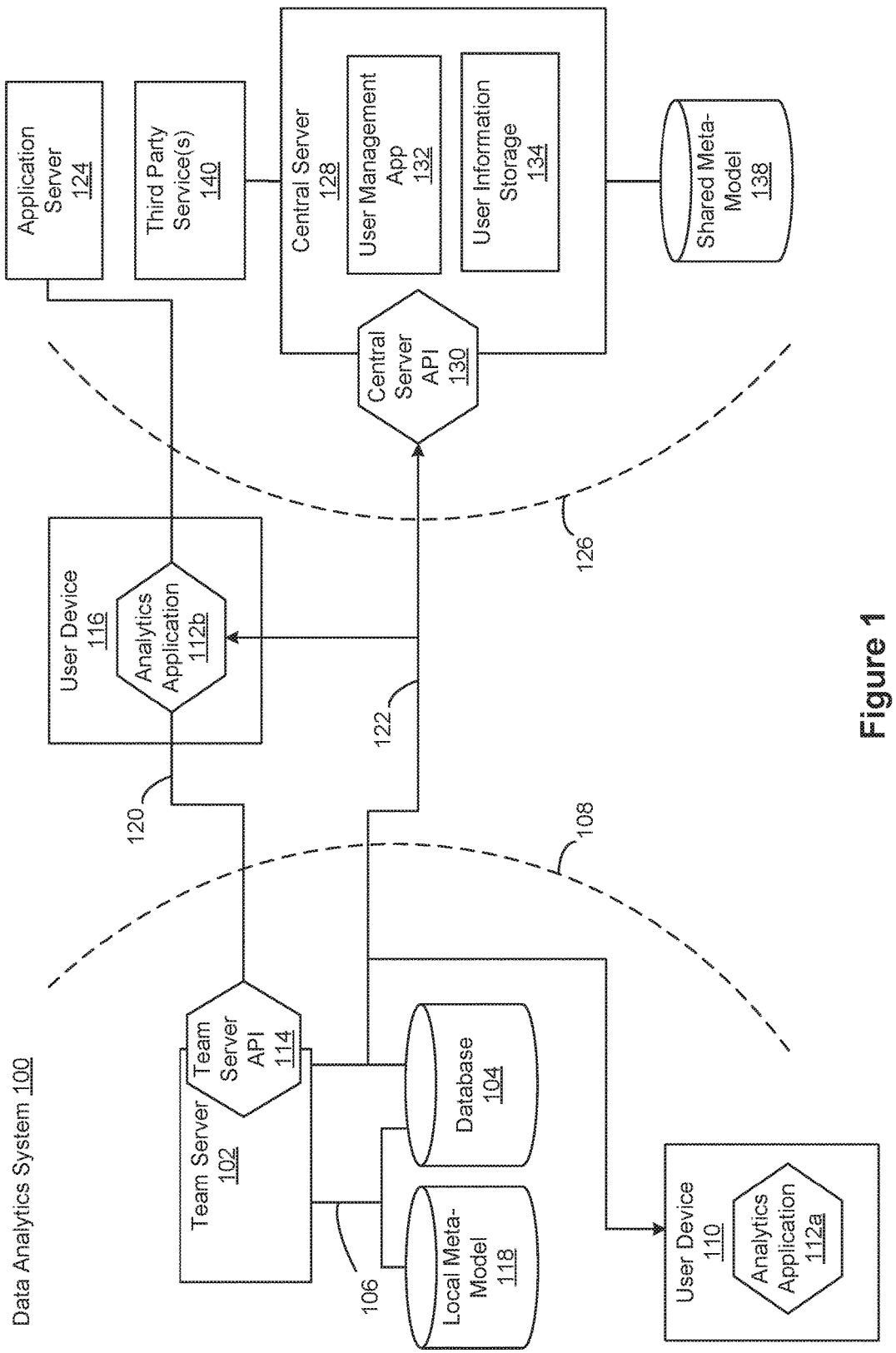
FIG. 1 is a system diagram of a data analytics system, in accordance with some embodiments.

FIG. 1 is a system diagram of a data analytics system 100, in accordance with some embodiments. Data analytics system 100 includes a team server 102 that is communicatively coupled to a database 104. Database 104 represents, e.g., one or more databases, data sources, and/or file stores. Team server 102 and database 104 communicate via a data connection 106 that is secured by a firewall. In some embodiments, all data communications between devices shown in a private network region indicated by 108 are secured by a firewall. Private network region 108 indicates, e.g., a business premises (such as an office, building, or campus), a private cloud, or a virtual private cloud. In some embodiments, database 104 is stored by memory 202 (FIG. 2) of team server 102. In some embodiments, database 104 is stored in a data storage device that is remote from team server 102 or across a plurality of data storage devices that are remote from team server 102. In some embodiments, a meta-model that corresponds to a schema of database 104 is stored by local meta-model 118.

Team server 102 executes a team server application program interface (API) 114. In some embodiments, team server API 114 handles requests to access data stored within private network 108, e.g., by performing authentication of security tokens and/or applying user access privileges. In some embodiments, team server API 114 communicates with a remote API, such as central server API 130 to determine user access privileges (e.g., access to one or more bookmarks), as described further below. In some embodiments, team server 102 determines user access privileges in accordance with information stored by team server 102 (e.g., when data access requests originate inside private network 108).

User computing device 110 is an example of a local device that communicates with team server 102 (e.g., via team server API 114). User computing device 116 is an example of a remote device that communicates with team server 102 via team server API 114. User computing devices 110 and 116 are, e.g., desktop or laptop computers and/or portable devices such as a phone or a tablet. In some embodiments, user computing device 110 and/or user computing device 116 executes an analytics application 112 that provides resources, such as tools for visualization, manipulation, analysis, and/or modeling, to aid a user in understanding data received by the user computing device. For example, user computing device 110 executes a data analytics application 112a and/or user computing device 116 executes a data analytics application 112b. In some embodiments, analytics application 112 includes a graphical user interface to generate a data bookmark (e.g., as described below with regard to FIG. 4). In some embodiments, a bookmark stored by team server 102 defines a scope of access to data from database 104 and analytics application 112 uses information associated with the bookmark (e.g., pointer information, as described below with regard to FIG. 5) to gain access to the defined scope of access to data from database 104.

When team server API 114 has determined that a user and/or application is authorized to access a data bookmark, (e.g., using secure token information and/or user authentication procedures), a user computing device (e.g., 110 and/or 116) is able to receive data from team server 102 in accordance with the scope of data defined by the data bookmark via a one-way secure data connection 122.

In some embodiments, user computing device 116 communicates with team server API 114 of team server 102 via a virtual private cloud and/or virtual private network connection 120.

In some embodiments, analytics application 112 is stored and distributed by and/or receives data from application server 124 located in the cloud (as indicated by region 126) via the Internet.

In some embodiments, data analytics system 100 includes a central server 128 for user management across multiple teams. Central server 128 communicates with user device 116 and team server 102 via the Internet (indicated by cloud region 126). Central server 128 performs user management services such as user authorization and user subscription management, e.g., in response to user management communications received via central server API 130. In some embodiments, central server 128 includes a user management application 132 for processing user management communications. For example, user management application 132 references user information storage 134, which includes, e.g., records of users registered with the system, team memberships of users, and information indicating access rights granted to users for bookmarks and/or projects (e.g., projects that include multiple bookmarks). In some embodiments, central server 128 includes a shared meta-model 138 to store metadata about databases across multiple team platforms. For example, shared meta-model 138 includes data models, data-objects, user profiles, and user access rights for access to multiple databases across team platforms. In some embodiments, user management application 132 references shared meta-model 138 to determine user access privileges associated with data bookmarks and/or projects.

In some embodiments, central server 128 communicates with one or more third party service(s) 140, e.g., for user authentication, token generation, and/or billing. For example, third party service(s) 140 include an identity management service (such as a social network, e-mail provider and/or internet service provider) that stores user access information. When central server 128 receives a request to authenticate a user, central server 128 communicates with the identity management service to determine whether the user is to be authenticated.

For example, in some embodiments, when a user sends a request to team server API 114 for access to data stored within private network 108, team server API 114 communicates with central server API 130 to request authentication of the user. Central server 128 determines authentication information for the user (e.g., authenticates the user and/or determines access privilege information for the user), and sends authentication information to team server API 114. In accordance with the received authentication information, team server 102 allows or denies access to data stored within private network 108.

Figure 2:
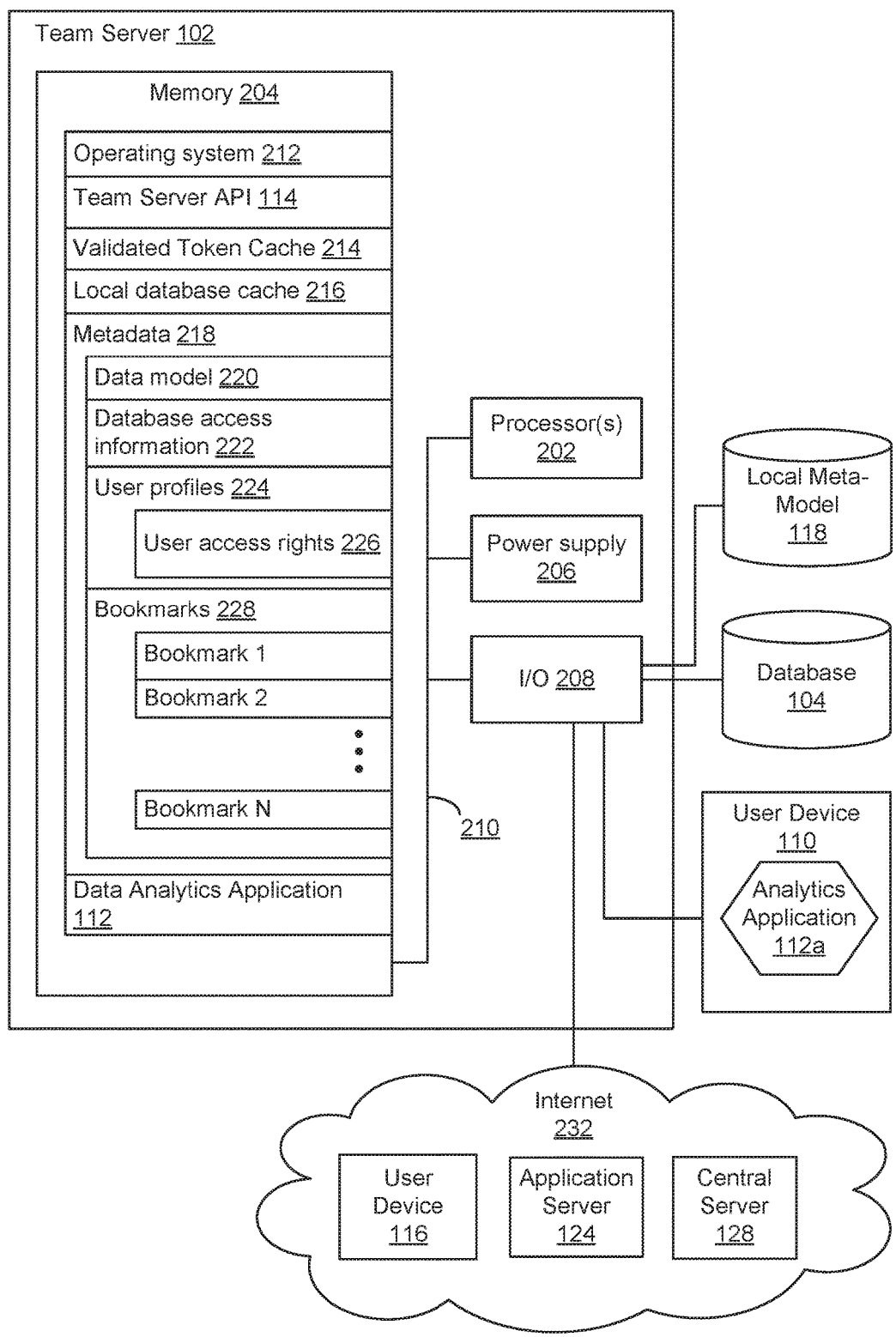
FIG. 2 is a system diagram of team server, in accordance with some embodiments.

FIG. 2 is a system diagram of team server 102, in accordance with some embodiments. Team server typically includes one or more processor(s) 202, a memory 204, a power supply 206, a communication system 208, and a communication bus 210 for interconnecting these components.

Processor(s) 202 execute modules, programs and/or instructions stored in memory 204 and thereby perform processing operations.

In some embodiments, the memory 204 stores one or more programs (e.g., sets of instructions) and/or data structures, collectively referred to as "modules" herein. In some embodiments, memory 204, or the non-transitory computer readable storage medium of memory 204 stores the following programs, modules, and data structures, or a subset or superset thereof:
  operating system 212;
  team server API 114, which determines access privileges in accordance with user authentication information and/or security token authentication information, as described further above with regard to FIG. 1;
  validated token cache 214, which stores information regarding tokens successfully validated by team server API 114;
  local database cache 216, which replicates at least a portion of data stored by database 104, and which is synchronized with database 104 (e.g., periodically, in response to user input, and/or based on another event that occurs during execution of an application, such as a database interface application executed by team server 102);
  metadata 218 that includes information about database 104, such as:
    a data model 220 (e.g., a schema for database 104)
    database access information 222, such as access keys and/or passwords for database 104
    user profile information 224, including user information and/or information about user access rights 226 (that control access to database 104); and
    data bookmarks 228 storage area 228; and
  data analytics application 112, which may be executed by team server 102 and accessed via a user interface of team server 102 and/or user device 210.

The above identified modules (e.g., data structures, and/or programs including sets of instructions) need not be implemented as separate software programs, procedures or modules, and thus various subsets of these modules may be combined or otherwise re-arranged in various embodiments. In some embodiments, memory 204 stores a subset of the modules identified above. Furthermore, the memory 204 may store additional modules not described above. In some embodiments, the modules stored in memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more of processor(s) 202. In some embodiments, user device 110 includes one or more processors (e.g., as described with regard to processor(s) 202) and memory (e.g., as described with regard to memory 204), and one or more of the modules described with regard to memory 204 is implemented on user device 110.

The communication system 208 enables communication with local devices (e.g., database 104, local meta-model 118, and/or user device 110) and/or remote devices (e.g., devices accessed via a network such as the Internet, as indicated at 232, such as user device 116, application server 124, and/or central server 128), via a wired and/or wireless connection. In some embodiments, communication system 208 includes components and/or instructions for a secure data connection 106 (e.g., a data connection protected by a firewall) for communication between team server 102 and one or more local devices. In some embodiments, communication system 208 includes components and/or instructions to enable communication of data from database 104 to remote devices (e.g., local user computing device 110, remote user computing device 116, and/or central server 128) via a one-way secure data connection 122 that carries outgoing data from team server 102 but does not carry incoming data into team server 102. In some embodiments, communication system 208 includes components and/or instructions for communications via a virtual private cloud and/or virtual private network connection 120. In some embodiments, communications via connection 120 are isolated from communications via data connections 106 and 122 that are secured within the private network 108 (e.g., secured by a firewall).

Communication bus 210 optionally includes circuitry (sometimes called a chipset) that interconnects and controls communications between system components.

Figure 3:
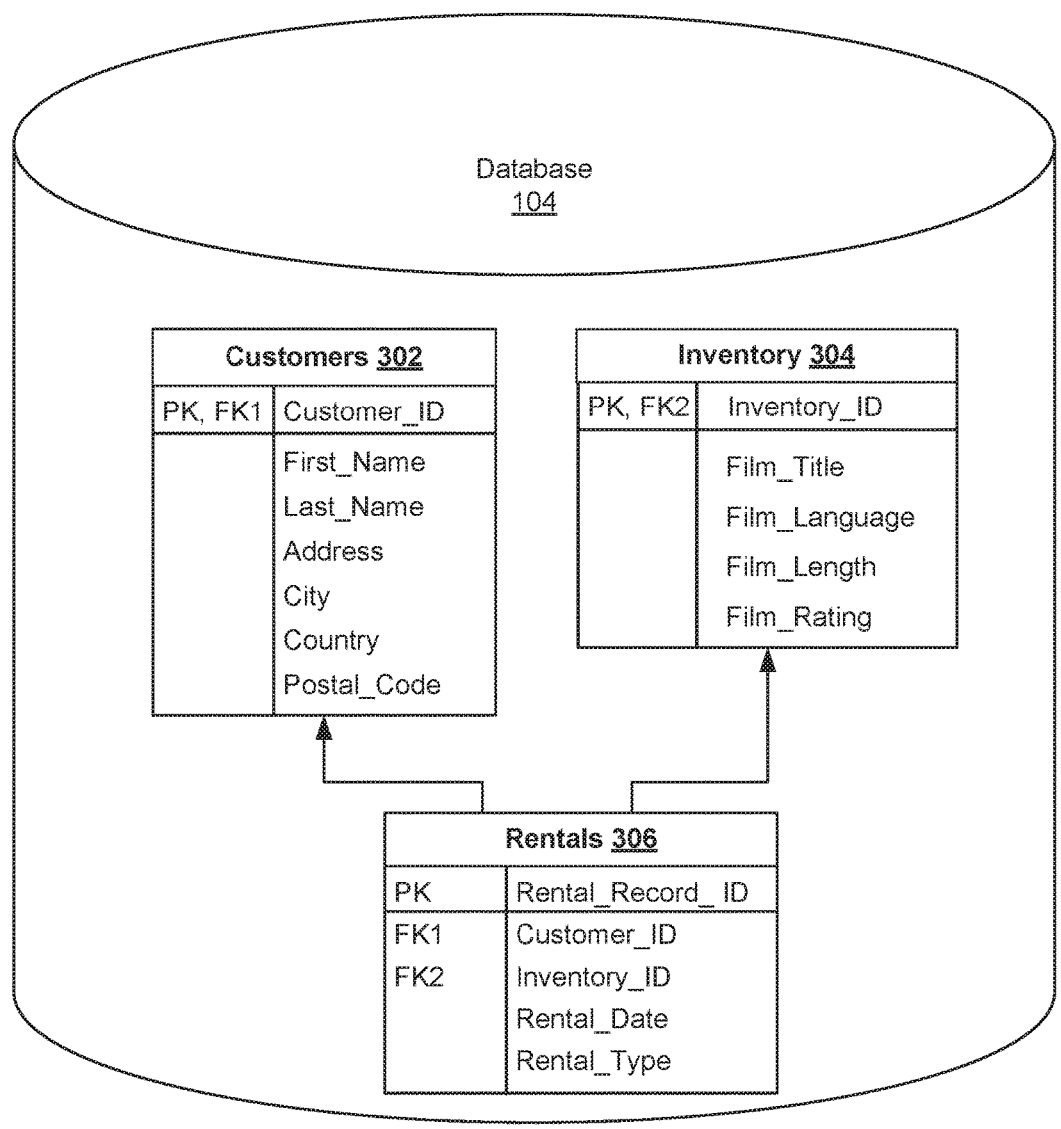
FIG. 3 is an illustrative schema for data stored by a database, in accordance with some embodiments.

FIG. 3 is an illustrative schema for data stored by database 104, in accordance with some embodiments. The schema shows tables that indicate the structure of data in database 104 and relationships between the tables. The illustrative schema includes customers table 302, inventory table 304, and rentals table 306. Customers table 302 includes columns "Customer_ID," "First_Name," "Last_Name," "Address," "City," "Country", and "Postal_Code." Entries in the customers 302 table of database 104 would include data for each customer. The "Customer_ID" column of customers table 302 is a primary key (PK), which indicates that each entry in this "Customer_ID" column is unique. The "Customer_ID" column of customers table 302 is a primary key that is also a foreign key (FK), which indicates the "Customer_ID" column is referenced by another table (e.g., rentals table 306).

While FIG. 3 illustrates a schema of a relational database, it will be recognized that data bookmarks as described herein may be generated for different types of databases. In some embodiments, a database model (such as a model of a relational database as illustrated in FIG. 3) is converted to a multidimensional database model for use by data analytics applications (such as applications 112a and/or 112b). In some embodiments, a meta-model that corresponds to the schema illustrated in FIG. 3 is stored by private network 108. For example, a meta-model that corresponds to the schema of database 104 is stored by local meta-model 118. A meta-model maps information from a schema of database 104, such as one or more columns of database 104, to aspects of the meta-model, such as one or more dimensions of the meta-model. In this way, applications are able to access data from database 104 via the meta-model. When the schema of database 104 is changed, the meta-model is re-mapped to the updated schema of database 104, which allows applications that rely on the data from the database 104 to continue to reference the data from database 104 via the meta-model without requiring updates to the application.

Figure 4:
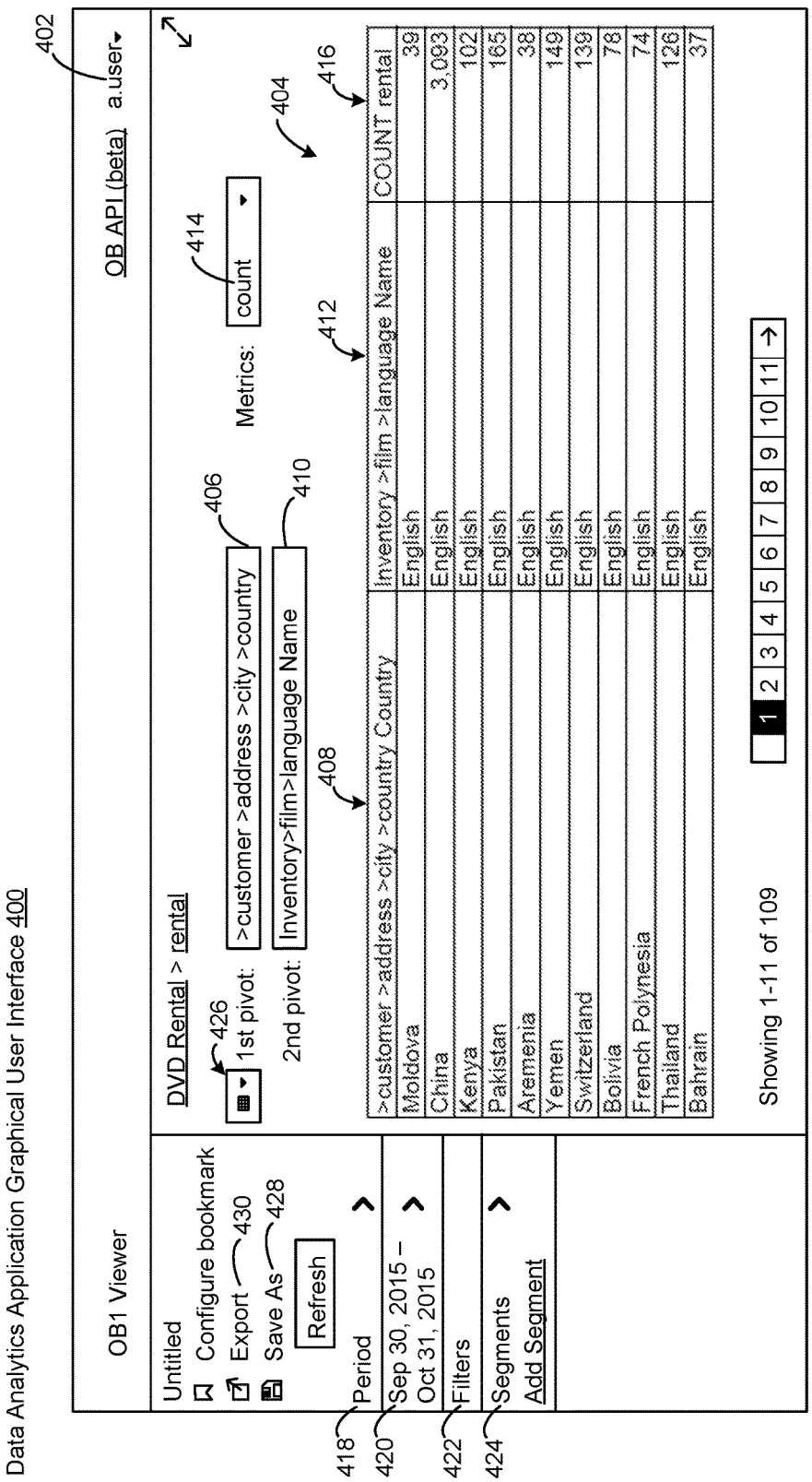
FIG. 4 illustrates a graphical user interface of a data analytics application, in accordance with some embodiments.

FIG. 4 illustrates a graphical user interface 400 of a data analytics application 112, in accordance with some embodiments. For example, graphical user interface 400 is a graphical user interface for a data analytics application 112 executed by team server 102, a data analytics application 112a executed by user device 110, and/or a data analytics application 112b executed by user device 116. As indicated at 402, a user with the username "a.user" is accessing the data analytics application. For example, the user "a.user" has been authenticated by team server 102 and/or central server 128 to use the data analytics application 112).

In some embodiments, graphical user interface 400 includes a data analytics display area 404 that displays data from database 104 and/or data corresponding to (e.g., data calculated from or otherwise based on) data in database 104. Typically, the data shown in data analytics display area 404 is selected, filtered, ordered, or otherwise has operations performed on it such that a subset of the data from database 104 is shown in a format that facilitates data analysis. For example, as shown at a first pivot field 406, the user has selected (for example, using selection tools provided by an interface of the data analytics application 112) a first pivot ">customer>address>city>country." As a result, data from a country column from database 104 (such as the country column of customers table 302, as shown in the illustrative database of FIG. 3) is displayed in data analytics display area 404, as shown at 408. As shown at a second pivot field 410, a second pivot ">Inventory>film>language Name" has been selected by the user. As a result, data from a language name column from database 104 (such as the film_language column of inventory table 304) is displayed, as shown at 412. As shown at drop down menu field 414, a metric "COUNT rental" has been selected by the user. As a result, a "COUNT rental" function has been performed on subset of the data from database 104 that corresponds to the intersection of the first pivot and the second pivot, as shown at 416. In this way, the user interface improves the speed and efficiency with which a user can access and analyze information from database 104 about the number of films of a film language that have been rented by customers in a country.

Time period selection control 418, filters control 422, and segment control 424 provide further tools for selecting and analyzing data. For example, a user uses time period selection control 418 to restrict a scope of data (e.g., displayed in analytics display area 404) to data that corresponds to the selected time range (e.g., as shown at 420). Filters control 422 is used to select one or more filters to apply (or that will be available to apply) to data from database 104 (e.g., data that corresponds to the intersection of the first pivot and the second pivot). Segment control 424 is used for selection of a segment, which is a defined scope of data that corresponds to data in database 104 (e.g., one or more columns, tables, dimensions, relations, metrics, filters, pivots, and/or functions applied and/or available to apply to database 104). Examples of segments include e.g., paying users, non-paying users, etc.

In some embodiments, a control is provided for selecting a data presentation format. For example, using drop down control 426, a user can select to display a chart that corresponds to the subset of data. In some embodiments, controls for adjusting a data presentation format includes controls to adjust ordering of data from database 104 and/or data corresponding to database 104.

In some embodiments, the graphical user interface 400 includes a control 428 for saving the defined scope of data (e.g., one or more columns, tables, dimensions, relations, metrics, filters, pivots, and/or functions applied and/or available to apply to database 104) and/or the state of the selected subset of data (e.g., the presentation format and/or application state) as a data bookmark. In this way, information about a subset of data from database 104 is stored for future reference by the user. Further, the bookmark includes a pointer that, when sent to another user, is usable to access the defined scope of data. In this way, team server 102 is enabled to provide a user with information about a defined scope of data that is available to a device that is outside of a private network, while restricting transmission of data from database 104 beyond the private network based on the defined scope of access.

In some embodiments, the graphical user interface 400 includes a control 430 for exporting a bookmark. In some embodiments, export control 430 is used to export a link to a bookmark to users beyond a private network (e.g., a network of devices indicated by region 108 in FIG. 1).

Figure 5:
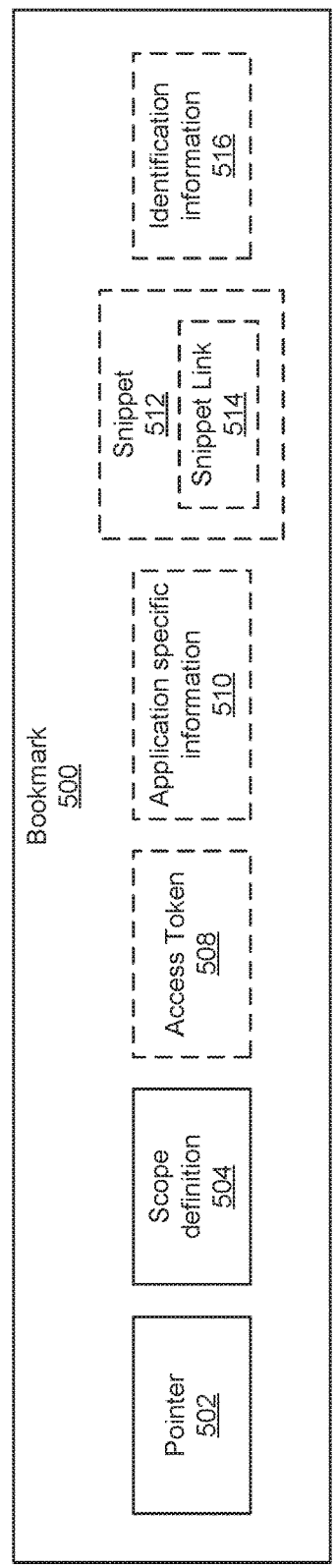
FIG. 5 is an illustrative data structure of a data bookmark, in accordance with some embodiments.

FIG. 5 is an illustrative data structure of a data bookmark 500, in accordance with some embodiments. A data bookmark 500 includes metadata for dynamically generating queries of data from database 104. In some embodiments, data bookmark 500 is stored in bookmarks storage 228 of memory 204 (FIG. 2). Data bookmark 500 typically includes a pointer 502 and a scope definition 504 that includes information defining a scope of access to data from database 104 and/or data corresponding to data from database 104.

Pointer 502, is, e.g., a uniform resource locator (URL) or other link to a network location, device location, and/or file location.

Scope definition 504 includes information that defines a scope of access to data that corresponds to data stored by one or more databases (e.g., database 104) that are secured (e.g., by a firewall) in a private network (such as a private network including the devices indicated in region 108 of FIG. 1). For example, the scope definition 504 indicates one or more columns, tables, and/or dimensions of database 104; and/or one or more relations, metrics, filters, pivots, and/or functions applied to and/or available to apply to database 104. In some embodiments, the scope definition includes information identifying one or more columns and/or one or more tables of one or more databases (such as the illustrative schema information for database 104 illustrated in FIG. 3). In some embodiments, the scope definition references a meta-model 118 (e.g., a dimension of meta-model 118) that corresponds to a schema of database 104, rather than referencing the schema of database 104. By referencing meta-model information that corresponds to a schema of database 104, rather than directly referencing the schema of the database 104, it is possible to change the underlying data and/or schema of database 104 without affecting the functionality of data bookmark 500.

In some embodiments, the scope definition 504 is defined by information provided via graphical user interface 400. For example, one or more pivots, filters, periods, metrics, and/or segments defined using controls of graphical user interface 500 are used to indicate the scope definition 504 of bookmark 500.

In some embodiments, the scope definition 504 includes data stored by database 104 (e.g., data in rows of tables 302, 304, and/or 306 of database 104, such as last names stored in the "Last_Name" column of customers table 302).

In some embodiments, the scope definition 504 does not include data that is stored by the one or more databases (e.g., database 104) that are secured in the private network 108 (e.g., the scope definition 504 does not include data that is stored in rows of tables 302, 304, and/or 306 of database 104). For example, the data that corresponds to data stored by one or more databases, as defined by scope definition 504, includes information that is calculated based on data that is stored by one or more databases (e.g., a total number of customers for which a Customer_ID is stored in the Customers table 302), includes information that indicates one or more types of data stored by the database (e.g., a datatype of one or more columns of the one or more databases, such as a "VARCHAR" data type for the Last_Name column of Customers table 302), and/or includes a column name that corresponds to (but is different from) a column name in the schema of the database (e.g., the name "Surname," which is mapped to the Last_Name column of Customers table 302), without including any of the underlying data from the database (e.g., from the rows of the database). In this way, a user that is outside of the private network 108 is provided with access to information that is based on data stored in private network 108 without being provided access to data stored in database 104. In this way, information about the raw data stored by the database and/or information about the database schema is hidden from users that are outside of private network 108.

In some embodiments, application 112 uses a data bookmark 500 to access data defined by scope definition 504 on behalf of the user. For example, when a user of application 112a and/or 112b is authenticated, a team server 102 authorizes access to all bookmarks stored by team server 102 to which a user has been granted access (e.g., as indicated by user access rights 226 and/or access information stored by bookmark 500).

In some embodiments, application 112 holds an authorization key (API key) that defines a set of accessible resources. For example, when a user is granted access to application 112a and/or 112b, application 112 uses its key (e.g., access token 508) to access a data bookmark 500 stored by team server 102.

Scope definition 504 is described further below with regard to FIGS. 6A-6C.

In some embodiments, data bookmark 500 includes an access token 508. An access token is used to restrict access to a data bookmark 500 stored by team server 102. For example, a token limits data bookmark 500, e.g., to one-time use, a defined number of uses, and/or use during a defined time period. In some embodiments, a token is included in pointer 502 (e.g., as a string of digits appended to a URL). A token is generated by, e.g., team server 102, central server 128, and/or a third party service 140 (e.g., an authentication service such as Auth0). For example, at the time a bookmark is generated, the device generating the bookmark (e.g., user device 110 and/or team server 102) sends a request via team server API 114 (and/or central server API 130) to a third party service 140 for a token 508. A token generated by the third party service 140 is received by the requesting device and incorporated into the bookmark 500 (e.g., as a part of bookmark pointer 502).

In some embodiments, data bookmark 500 includes application specific information 510. For example, application specific information includes information about how data from database 104 is displayed. Display information includes, e.g., a data presentation format, such as chart, graph, and/or table and/or ordering information for one or more sets of data.

In some embodiments, data bookmark 500 includes a snippet 512. A snippet 512 is a preview of data that is associated with scope definition 504 of bookmark 500. In some embodiments, a snippet 512 includes a preview of a portion, less than all, of data from database 104 as defined by scope definition 504 (e.g., scope definition 504 includes data from database 104 that would span multiple displayed pages of a graphical user interface 400 of application 112, and snippet 512 includes a preview of data that would be displayed on a single displayed page). In some embodiments, a snippet 512 is a graphical presentation of a preview of data associated with scope definition 504, such as a table, chart, array of values, and/or single example of the data that corresponds to scope definition 504. In some embodiments, a snippet 512 in a preview of datatypes that are associated with scope definition 504 of bookmark 500. Snippet 512 includes, e.g., data that is stored in rows of database 104 and/or data that is determined based on (e.g. calculated from) or otherwise associated with data stored in rows of database 104.

In some embodiments, bookmark 500 stores a snippet link 514 (e.g., a snippet URL that is distinct from a pointer link 502) that corresponds to snippet 512. For example, when a user device 110 uses a snippet link 514 to request a snippet 512 from team server 102, team server 102 provides snippet 512 to the user device 110. In some embodiments, a snippet 512 is transmitted from team server 102 and/or user device 110 to a remote device 116 (in lieu of and/or in addition to snippet link 514). In some embodiments, user authentication and/or token verification is required to access the data indicated by the scope definition 504 of bookmark 500, while displaying the snippet 512 does not require user authentication and/or token verification.

In some embodiments, access to data indicated by the scope definition 504 is limited to access within data analytics application 112, whereas snippet 512 is accessible without executing application 112. For example, when a local user of private network 108 sends a snippet link 514 to a remote user, the remote user can view the snippet link in an application via which the snippet link was received (e.g., e-mail, messaging protocol, and/or social network application). In this way, a user is provided with a snapshot view of the data associated with bookmark 500 without needing perform user authentication and/or accessing data analytics application 112. In some embodiments, the snippet 512 includes an amount of data that does not exceed the amount of data that can be simultaneously displayed on the user interface (for example, when the data defined by the scope of access includes multiple pages of data, the snippet includes a first page of the multiple pages of data). In another example, the snippet includes data that is the result of applying one or more filters, functions, and/or presentation formats to data defined by scope definition 504.

In some embodiments, the information for displaying a snippet 512 includes different graphical preview information tailored to different applications (e.g., the information for displaying a snippet includes a first snippet with a first snippet format for a first application and a second snippet with a second snippet format that is different from the first snippet format for a second application).

In some embodiments, data bookmark 500 includes identification information 510. For identification information 510 includes, e.g., a bookmark name, a bookmark type, one or more projects associated with the bookmark 500 and/or one or more users associated with the bookmark 500.

In some embodiments, data bookmark 500 and/or team server 102 may store access information to provide applications with access to data bookmark 500 on an application by application basis.

Figure 6B:
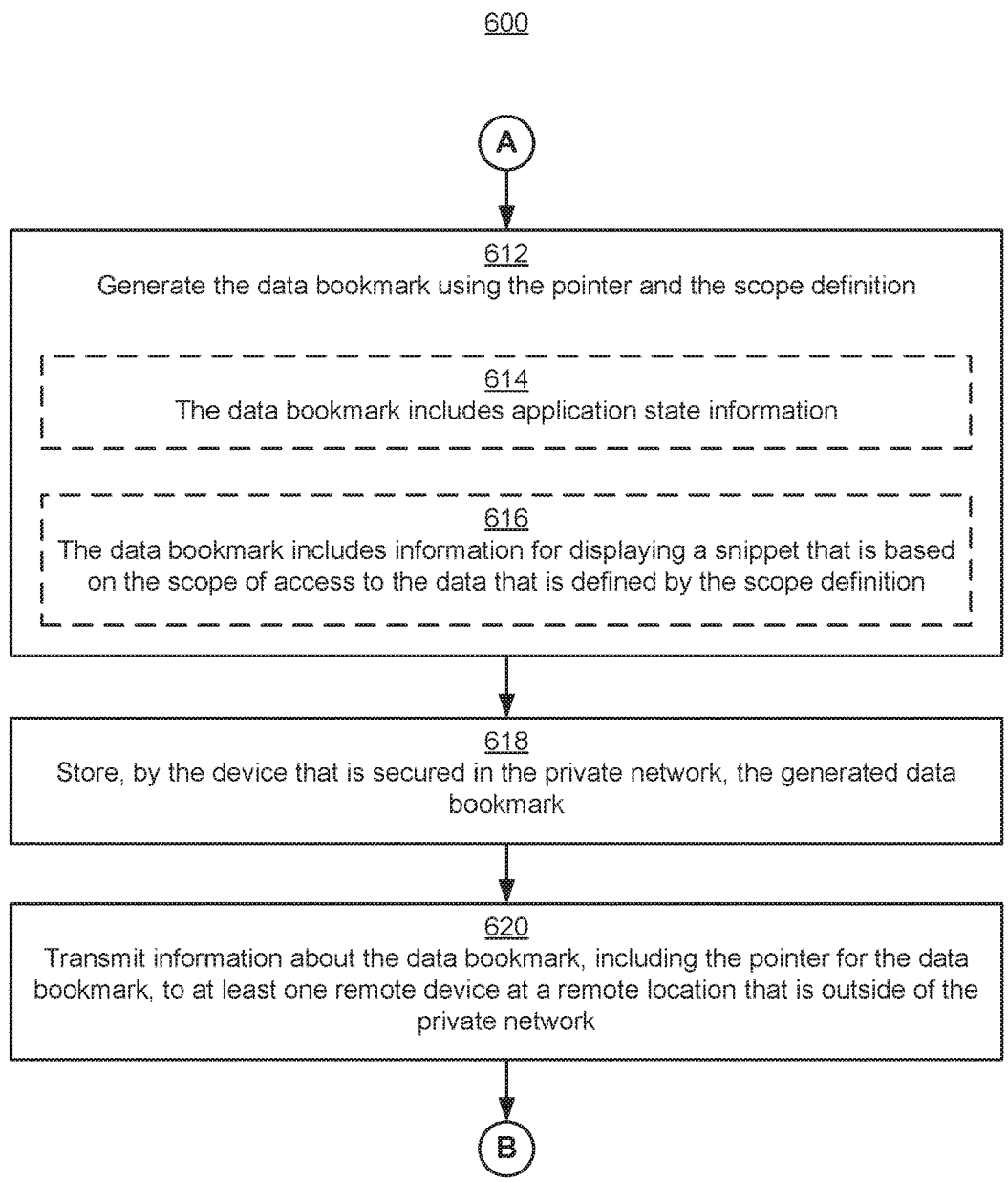
Figure 6C:
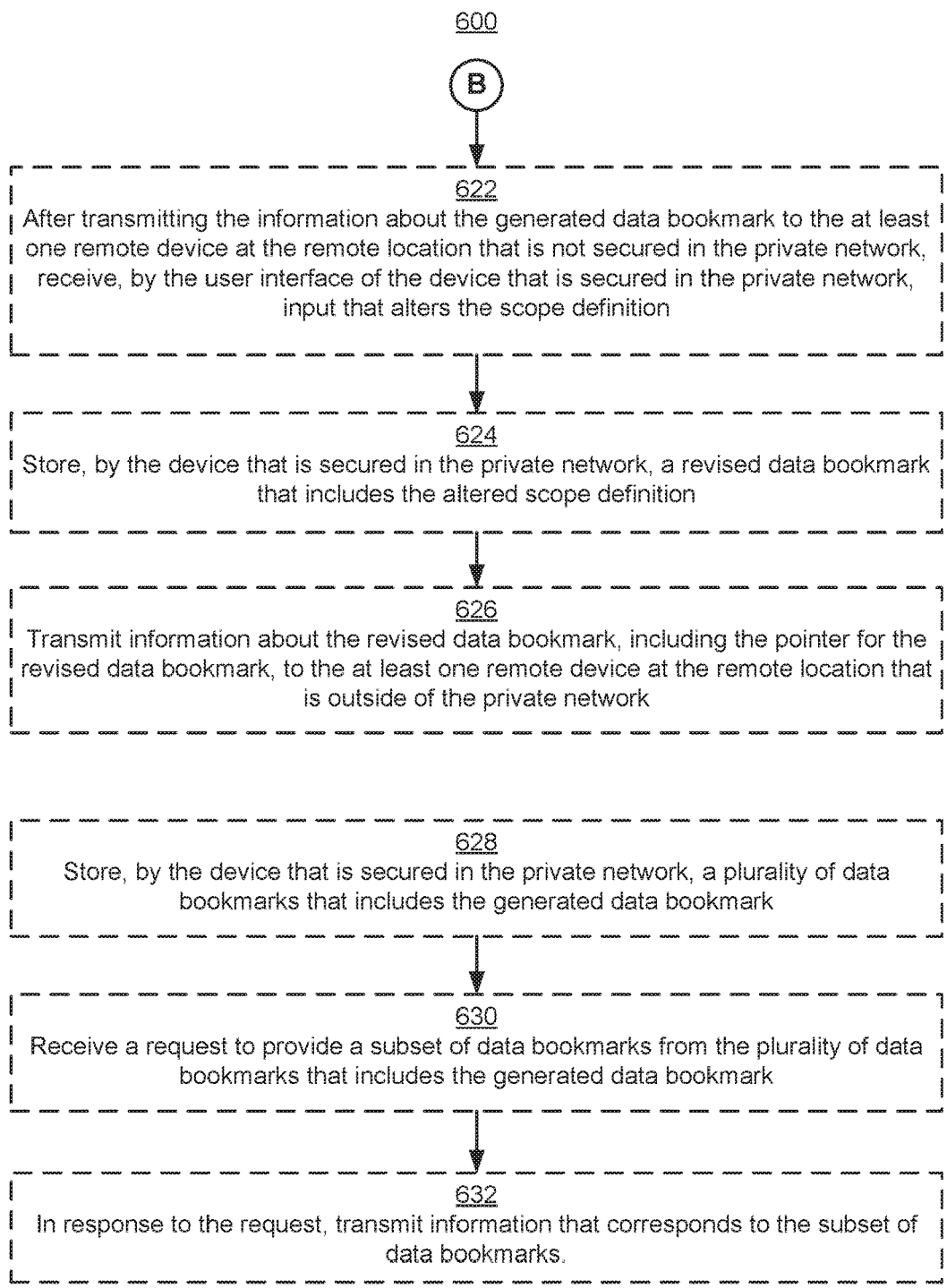

FIGS. 6A-6C are flow diagrams illustrating a method 600 for distributing a data bookmark 500, in accordance with some embodiments. The method 600 is performed at a device, such as team server 102 and/or user device 110. For example, instructions for performing the method 600 are stored in the memory 204 (or a memory of user device 110) and executed by the processor(s) 202 of the team server 102 (or a processor of user device 110). The device is secured (e.g., by a firewall) in a private network 108.

The device receives (602), by a user interface of a device (e.g., graphical user interface 400), a scope definition that includes information that defines a scope of access to data that corresponds to data stored by one or more databases that are secured (e.g., by a firewall) in the private network 108. For example, a user designates a scope of access to data using one or more controls (e.g., pivot controls 406 and/or 410, metrics control 414, period control 418, filters control 422, segments control 424, and/or data presentation control 426) of graphical user interface 400.

In some embodiments, bookmark 500 includes metadata that enables queries to be performed on data referenced by the scope definition 504. For example, a query performed on data referenced by the scope definition retrieves a dataset that includes, e.g., a query definition, a result metadata definition (indicating identification information for each column and/or dimension and the relationship between the query and the column and/or dimension), and data from database 104 (and/or data based on data from database 104) in a requested format. In some embodiments, a bookmark 500 enables enacting an execution plan that includes a plurality of SQL statements. An example execution plan is provided below.

In some embodiments, a data bookmark 500 allows a user to override a parameter of scope definition 504. For example, a user may be enabled to add or remove, e.g., a column, dimension, metrics, function, and/or filter to scope definition 504.

In some embodiments (604), scope definition 504 includes information that indicates a portion, less than all, of the data stored by the one or more databases (e.g., database 104). For example, a portion, less than all, of the data stored by the one or more databases includes data from (and/or data determined based on) one or more of a column, a set of columns, a table, a set of tables, a database, a set of databases, and/or a view that includes data from one or more tables from one or more databases. In some embodiments, the scope definition includes information about part or all of the data model of one or more databases.

In some embodiments, the scope definition includes information that maps to part or all of the data model of one or more databases. For example, the scope definition references a meta-model (e.g., local meta-model 118) that includes a representation of data stored by one or more databases. In some embodiments, a scope definition that references local meta-model 118 indicates, e.g., a domain, dimension, metric, filter, and/or function of the meta-model 118 (and/or applicable to the meta-model 118). By storing information that references the meta-model in data bookmark 500, a subset of the data from the one or more databases can be made available (e.g., to a remote user outside private network 108) via data bookmark 500 without exposing information about the database schema to the remote user. An application that uses a data bookmark 500 that references a meta-model 118 (rather than the database schema) is readily portable to a different database or schema, and is not impacted by database changes.

In some embodiments, scope definition 504 includes (606) includes one or more filters that are available to be applied to the portion, less than all, of the data stored by the one or more databases (as described with regard to 604). For example, the one or more filters include, e.g., a first filter that corresponds to a first film title stored in a first row of the Film_Title column of inventory table 304 of database 104 and a second filter that corresponds to a second film title stored in a second row of the Film_Title column of inventory table 304 of database 104. In this illustrative example, a user is able to select to apply the first filter, the second filter, or both the first filter and the second filter to the portion of data stored by the one or more databases.

In some embodiments, (608) scope definition 504 includes information that indicates at least one value determined by performing at least one operation on data stored by the one or more databases. For example, operations on the data stored by the one or more databases (e.g., database 104) include metrics and functions, e.g., ABS, ACOS, ASC, ASIN, ATAN, AVG, COALESCE, CONCAT, COUNT, COUNT_DISTINCT (e.g., to return a number of distinct rows), DISTINCT, DESC, EXP, GREATEST, LEAST, LN, LOG, MAX, MEDIAN, MIN, MINUS, NULLIF, SIN, SQRT, STDDEV, SUM, TAN, and/or custom metrics and/or functions. In some embodiments, operations on the data stored by the one or more databases (e.g., database 104) include other calculations performed using the data stored by the one or more databases, such as a custom (e.g., user defined) operation, a rollup operation and/or a comparison operation. In some embodiments, the scope definition includes information that indicates one or more operations that are available to be performed on data stored by the one or more databases, such as the operations described above.

In some embodiments, scope definition 504 includes a filter that is based on a value stored in a database (e.g., the value is included in the scope definition).

In some embodiments, scope definition 504 includes a filter that is based on a relative value (e.g., a relative value for defining a timeframe, such as "the last three months (from today)"). A relative value depends on the state of database 104 at a particular time and is computed when the bookmark is evaluated (e.g., when the bookmark is accessed by application 112).

In some embodiments, scope definition 504 includes a filter that is based on a formula (e.g., a formula using one or more operations as described above, and/or a formula that defines a segment). In some embodiments, a formula is encapsulated in meta-model 118 such that the formula is not exposed in the scope definition of the data bookmark 500.

In some embodiments, scope definition 504 includes a filter that is applied based on user parameters in accordance with user authentication performed (e.g., by a third party service 140) for a user. For example, if user parameters (e.g., stored in user information storage 134) indicate limits on the data that a user is able to access, such as "data from the past week," the user parameter filter may be applied in addition to any filters of the scope definition.

The device generates (610) a pointer 502 (e.g., a link, such as a uniform resource locator (URL)) for the data bookmark 500. In some embodiments, the pointer 502 includes an access token 508. For example, the device obtains (e.g., receives from a remote source, such as third party service 140, or generates, e.g., at team server 102) access token 508. In some embodiments, access token 508 includes a cryptographic key. In some embodiments, access token 508 is activated for a defined period of time. For example, when a user device 116 uses pointer 502 to request access to content defined by a data bookmark 500 at team server 102, team server 102 analyzes access token 508 of pointer 502 to determine whether the time of the request is within a defined period of time for access token 508, and responds to the request accordingly. In some embodiments, access parameters associated with access token 508 are adjustable. For example, access to a data bookmark 500 may be revoked by changing a parameter stored by team server 102 (e.g., at database access information 222). When a user device 116 uses pointer 502 to request access to content defined by a data bookmark 500 at team server 102, team server 102 analyzes access token 508 of pointer 502 to determine whether access to data bookmark 500 has been granted or revoked, and responds to the request accordingly.

The device generates (612) the data bookmark 500 using the scope definition 504 and the pointer 502. In some embodiments, the data bookmark 500 is generated in response to user input at detected at control 428 of graphical user interface 400 (e.g., to store a data bookmark 500 that is based on the parameters indicated in graphical user interface 400).

In some embodiments, the data bookmark 500 includes (614) application state information (e.g., stored in data bookmark 500 as application specific information 510). Whereas scope definition 504 of data bookmark 500 indicates a range of information that is accessible by bookmark 500, application state information of data bookmark 500 includes, e.g., one or more filters, functions, range limits, sort order, and/or presentation format for presenting part or all of the information indicated by scope definition 504. For example, when a scope definition 504 includes multiple filters that are available to be applied to data from database 104, application state information indicates a particular filter of the multiple filters that is applied to the data from database 104 when the application 112 (initially) uses data bookmark 500. A user is then able to use application 112 to apply additional or different filters from scope definition 504 to change the presentation of data in application 112.

In some embodiments, data bookmark 500 includes (616) information (e.g., snippet link 514) for displaying a snippet 512 that is based the scope of access to the data that is defined by the scope of access to the data stored by the one or more databases. In some embodiments, For example, a snippet 512 is a graphical preview of data accessible via data bookmark 500.

In some embodiments, the information for displaying a snippet 512 includes a snippet link URL 514 that corresponds to the snippet. For example, data bookmark 500 includes a first URL for pointer 502 and a second URL 514 for snippet 512.

The device stores (618), by the device that is secured in the private network, the generated data bookmark 500. For example, the generated data bookmark 500 is stored in bookmarks storage 228 of memory 204 of team server 102, as illustrated by FIG. 2. Team server 102 is a device within private network region 108, which is secured, e.g., by a firewall of the private network 108.

The device transmits (620) information about the data bookmark 500, including the pointer 502 for the data bookmark 500, to at least one remote device at a remote location that is outside of the private network (e.g., to a device beyond region 108, such as user device 116 and/or central server 128). In some embodiments, the transmitted information about the data bookmark 500 includes snippet link 514. For example, a user within private network 108 (e.g., a user of local device 110) transmits pointer 502 to a user outside of private network 108 (e.g., a user of remote user device 116), e.g., via e-mail, messaging service, a social network, and/or within application 112. In some embodiments, pointers 502 are exchangeable between local users within private network 108. In some embodiments, pointers 502 are exchangeable between remote users outside of private network 108.

Pointer 502 and/or snippet link 514, when transmitted to the at least one remote device at the remote location outside private network 108, is stored for use by a user (e.g., by memory of a user device 116) and/or by an application (such as a data analytics application 112b that displays a visual representation of some or all of the data (or based on the data) defined by scope definition 504 of the data bookmark 500).

In some embodiments, when a user attempts to access data bookmark 500 using pointer 502, team server API 114 evaluates a token embedded in pointer 502 to determine whether to authorize access to the data defined by scope definition 504 of data bookmark 500. In some embodiments, when a user attempts to access data bookmark 500 using pointer 502, team server API 114 performs authentication of the requesting user to determine whether to authorize access to the data defined by scope definition 504 of data bookmark 500. For example, team server API 114 sends a request to central server API 130 for central server 128 to perform the user authentication.

In some embodiments, at least some information associated with data bookmark 500 is not transmitted to a remote device beyond private network 108 when the bookmark pointer 502 and/or bookmark snippet link 514 are transmitted to the remote device. For example, scope definition information 504 is not transmitted to a remote device when the bookmark pointer 502 and/or bookmark snippet link 514 are transmitted to the remote device. Rather, when data bookmark 500 stored by team server 102 is accessed by a user device (e.g., remote user device 116), team server 102 uses scope definition information 504 to determine data that will be provided to a remote user. In this way, scope definition information 504 of data bookmark 500, and database schema information and/or meta-model information referenced by scope definition information 504 is protected. Further, when scope definition information 504 is altered at team server 102, bookmark 500 remains accessible to remote users that possess pointer 502.

In some embodiments, after transmitting the information about the generated data bookmark 500 to the at least one device (e.g., user device 116) at the remote location that is not secured in the private network, the device receives (622), by the user interface (e.g., graphical user interface 400) of the device (e.g., team server 102 and/or user device 110) that is secured in the private network 108, input that alters the scope definition 504. For example, the scope definition 504 is expanded to include one or more additional columns, tables, dimensions, relations, metrics, filters, pivots, and/or functions applied and/or available to apply to database 104; reduced to exclude one or more columns, tables, dimensions, relations, metrics, filters, pivots, and/or functions applied and/or available to apply to database 104; and/or revised to include a different set of columns, tables, dimensions, relations, metrics, filters, pivots, and/or functions applied and/or available to apply to database 104.

The device that is secured in the private network (e.g., team server 102) stores (624) a revised data bookmark that includes the altered scope definition (504). For example, team server 102 stores the revised data bookmark in bookmarks storage 228 of memory 204 of team server 102, as illustrated by FIG. 2.

The device transmits (626) information about the revised data bookmark, including the pointer 502 for the revised data bookmark (and/or a snippet link 514 for the revised data bookmark), to the at least one remote device at the remote location (e.g., user device 116) that is outside of the private network 108. In this way, a data bookmark 500 that is used by an application (e.g., data analytics application 112*b*) on a remote device can be revised with minimal impact on the functionality of application 112*b*.

In some embodiments, the device stores (628), by the device that is secured in the private network (e.g., team server 102), a plurality of data bookmarks that includes the generated data bookmark 500. For example, the plurality of data bookmarks are stored in bookmarks storage 228 of memory 204 of team server 102, as illustrated by FIG. 2. In some embodiments, information (e.g., bookmark identification information 516 and/or bookmark snippet links 514) for at least a subset of the plurality of bookmarks in bookmarks storage 228 are exposed to a remote device (e.g., user device 116) via team server API 114. In this way, a remote device can request access to information associated with one or more bookmarks exposed via team server API 114 (e.g., to allow a user to peruse available bookmarks). In some embodiments, a subset of the plurality of bookmarks that are made available to a remote device by team server API 114 are limited in accordance with user access parameters (e.g., as stored by user information storage 134 of central server 128 and/or bookmark identification information 516).

The device receives (630) a request to provide a subset of data bookmarks from the plurality of data bookmarks 228 that includes the generated data bookmark 500. For example, the request is generated by a user (e.g., of user device 116 and/or user device 110) and/or by an application (e.g., data analytics application 112*a* and/or data analytics application 112*b*).

In response to the request, the device transmits information that corresponds to (632) the subset of data bookmarks (e.g., bookmark identification information 516 and/or snippet link 514), e.g., in accordance with access privilege information associated with the subset of data bookmarks and/or category information associated with the subset of data bookmarks. For example, in some embodiments, only bookmarks associated with a particular user and/or including particular information in bookmark identification information 516 are transmitted in response to the request.

An example of a data bookmark 500 is provided below.

```
{
"id": {
"projectId": "dvdrental",
"bookmarkId": "57d04fcd2dbe0c568819efa7"
},
"path": "/USER/546ca9680cf2d158717dc0a3",
"config": {
"bookmark": null,
"project": "dvdrental",
"selection": {
"facets": [
{
"selectedItems": [
{
"type": "i",
"lowerBound": "2005-10-08T00:00:00.000+0000",
"upperBound": "2015-10-31T00:00:00.000+0000"
}
],
"dimension": {
"id": {
"projectId": "dvdrental",
"domainId": "public:rental",
"dimensionId": "e433950730abcb33c56e4b3de28f4ed64ef92c24c0523b36f6c8afc9561fec96"
},
"type": "CONTINUOUS",
"expression": {
"value": "to_date('rental_date')",
"level": 0
},
"parentId": null,
"attributes": [ ],
"visible": true,
"valueType": "DATE",
"dynamic": false,
"oid": "e433950730abcb33c56e4b3de28f4ed64ef92c24c0523b36f6c8afc9561fec96",
"objectType": "Dimension",
"_role": "OWNER",
"children": [
"attributes"
],
"name": "Rental_Date"
},
"id":
"@'public:rental'.@'e433950730abcb33c56e4b3de28f4ed64ef92c24c0523b36f6c8afc9561fec96'"
},
```

-continued

```
{
"selectedItems": [
{
"id": "India",
"type": "v",
"value": "India"
}
],
"dimension": {
"id": {
"projectId": "dvdrental",
"domainId": "public:address",
"dimensionId": "56eae20115abcc05b0e2b8b1"
},
"type": "CATEGORICAL",
"expression": {
"value": "'city'.'country'#'country'",
"level": 0
},
"parentId": null,
"attributes": [ ],
"visible": true,
"valueType": "STRING",
"dynamic": false,
"oid": "56eae20115abcc05b0e2b8b1",
"objectType": "Dimension",
"_role": "OWNER",
"_children": [
"attributes"
],
"name": "Country"
},
"id":
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'56ea
e20115abcc05b0e2b8b1'"
}
],
"compareTo": [ ]
},
"orderBy": [
{
"direction": "DESC",
"expression": {
"value": "@'public:rental'.[measure:'COUNT rental']"
}
}
],
"customer": "51adbb070cf2749bfccf2569",
"domain": "public:rental",
"currentAnalysis": "tableAnalysis",
"availableDimensions": [
"@'public:rental'.@'f8d7ac83f9b9e6ec72967ab596da208f5a42fb4b996b21b0fc3e0b5726375
4dd'",
"@'public:rental'.@'56b1eaf015abcc3b4f3c2de4'",
"@'public:rental'.@'56b3331b15abcc3b4f3c3cbe'",
"@'public:rental'.@'e433950730abcb33c56e4b3de28f4ed64ef92c24c0523b36f6c8afc9561fec
96'",
"@'public:rental'.@'c94447918967fabec1a88e66bc758095c254a8d6b58762f599bb528060fb2
c70'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'d347
526835e5eb573c913b81b448b742286c05564d68399137b1e7437a9cb2df'.@'9519368433d91
f9818ce3e380bd4b7a18584336da11368b9e5b7371d1dab71a8'.@'2046e5935e6082b28044c3
6a5f8aaaa90ece6578c565fabd210a0bda5028e139'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'d347
526835e5eb573c913b81b448b742286c05564d68399137b1e7437a9cb2df'.@'b03fba2af58318
0d5689a93e157d0c4a08e614cb405a2baf682b840366337f0e'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'6bdb
fdeb773a582da6c7cffcd384ec4a232dca166b77c96b4fdcd302955814b6'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'15a2
d39a917bd8a5db61ca8c33213a831d98533c21a28366890082a9f5db531a'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'56ea
e21715abcc05b0e2b8b7'",
```

```
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'56ea
e20115abcc05b0e2b8b1'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'5e82
73dab115ea1de401716d27a2f1035d4ef8b0fc881bd8afbd4100bdaef8ee'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'bdb5
486f29a4683fb96de5421005edddce340f6f1c46ee3f11dcb0143141f57f0'",
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'3ff1c
7de69856117ce45d4b71d0e3eb00343904c7c3ae4630b827883df8edea2'",
"@'public:rental'.@'575063ad20297b4a3bd2c6f3d14e132603106d61b821422d9b561301830
e1e8c'.@'56eae1b415abcc05b0e2b879'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'4dd3a
ea014d8ded2c1f96f68e45edd1b5443305f7d4190d23517997e71af8ef9'.@'b70a47718e3c703e
b1514042b6612d4fd1e20c355fcd23a0999c49e42ec979cb'.@'42492f1742ac0b030017a207a8
9c86425b470e8a6e95a277475da35ed3bb108c'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'4dd3a
ea014d8ded2c1f96f68e45edd1b5443305f7d4190d23517997e71af8ef9'.@'b70a47718e3c703e
b1514042b6612d4fd1e20c355fcd23a0999c49e42ec979cb'.@'56eae17215abcc05b0e2b859'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'4dd3a
ea014d8ded2c1f96f68e45edd1b5443305f7d4190d23517997e71af8ef9'.@'b70a47718e3c703e
b1514042b6612d4fd1e20c355fcd23a0999c49e42ec979cb'.@'0de48f425df6eedeae51d479d8a
eca4d548622645e2117fc39f69d1ee882d18a'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'4dd3a
ea014d8ded2c1f96f68e45edd1b5443305f7d4190d23517997e71af8ef9'.@'b70a47718e3c703e
b1514042b6612d4fd1e20c355fcd23a0999c49e42ec979cb'.@'26da82a608ec4a3715d1ca78c5
9815342cf060c8ee94dee81a34b6ab8a1ae5e6'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'0a23e
304c8b18d97e6b282db96a4fb54010ae04f052d0070e18ec9c785a9eb7c'.@'e41e3cf0c831cd61
cd60b480db925def049537b4faebe60c82179bf75d5a674b'.@'a1b33bc1eef1e383d9777386b8f
994ae976f00c1b9616bf2eb682835524a670a'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'0a23e
304c8b18d97e6b282db96a4fb54010ae04f052d0070e18ec9c785a9eb7c'.@'e41e3cf0c831cd61
cd60b480db925def049537b4faebe60c82179bf75d5a674b'.@'d8123a553ada5d35ed87481626
c9a5235b2988309b39183581e7e6400dababe6'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'93442
08045db08c9e255bddd27c77c4c82c19aa0bfe30185b8900868f3754115'.@'a74cc2dd81b4356
fe19757764c9d99f5fde55c2eb74a30a736b5a408ae32e82a'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'9549b
ba37cb941c2895233f867300784aeb89095d1e8b47b0b5abbbd27856961'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'58faf
93ce6c9fc6fe9c56d15e6136b6c446061a76e198e8269077451fddb8c03'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'728f1
41f13048c715c3fc1e1488220816df82eea85ed6968f66376dc91d83ac7'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'2a4d0
612ee4b0c3b1f7eda77a7748df09a43e4d5c02fa7d859f6d4c638157c00'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'2d076
64d7547ba4f05f7bcbc27365995510e7d87875009dbf4a237732bd2b3c4'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'576ba
37e15abcc520afb77ab'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'62f73
246761273d1fa2237b462d74f8f35ef767abeda11328e44bb7a9b4adac6'",
"@'public:rental'.@'4b30f7756d52be710ef582fe9c74fdf722bb423efb3d190333ec77be6a0034
24'.@'04b514783d41562326099b1c4b61f968c5abf7f08e4ce46a5a4bf54a4c37f5c6'",
"@'public:rental'.@'4b30f7756d52be710ef582fe9c74fdf722bb423efb3d190333ec77be6a0034
24'.@'128459e35915c95facabc0965ef3d43d1a4d08e19bcf3dd50d7ed9feaae994be'"
],
"availableMetrics": [
"141445ddce0bb5fb3128f26150fdd8bdce87dea31447bc4ca825b75f50870d74",
"51d6c15e9e1c9576e88974c8f0a042adea5810680f195995ec21baf390b0efa0",
"5666a17515abcc53ff1d1f13",
"5666a32015abcc53ff1d1f5b",
"56b3323e15abcc3b4f3c3c5c",
```

-continued

```
"56b3328615abcc3b4f3c3caa",
"56b332c615abcc3b4f3c3cb4",
"b47681ec524c6b1ead41ccb7886eab52aa24559433af76d31e30a1948d02de4a"
],
"chosenDimensions": [
"@'public:rental'.@'575063ad20297b4a3bd2c6f3d14e132603106d61b821422d9b561301830
e1e8c'.@'e2fb87ae8373f317b6035f412a9c1af89b1a4d8ae915e00ef958da5ad7def2fb'.@'56ea
e20115abcc05b0e2b8b1'",
"@'public:rental'.@'4b30f7756d52be710ef582fe9c74fdf722bb423efb3d190333ec77be6a0034
24'.@'2560c97ba45d46997b0665e266b84b10b30f9a96aa2c27723d754dbcdf2fdb55'.@'62f73
246761273d1fa2237b462d74f8f35ef767abeda11328e44bb7a9b4adac6'"
],
"chosenMetrics": [
"141445ddce0bb5fb3128f26150fdd8bdce87dea31447bc4ca825b75f50870d74"
],
"limit": 1000,
"maxResults": 10,
"startIndex": 0,
"period": {
"public:rental":
"@'public:rental'.@'433950730abcb33c56e4b3de28f4ed64ef92c24c0523b36f6c8afc9561fec
96'"
}
},
"bbid": "dvdrental:57d04fcd2dbe0c568819efa7",
"dynamic": false,
"oid": "57d04fcd2dbe0c568819efa7",
"objectType": "Bookmark",
"_role": "OWNER",
"name": "Adrien's bookmark"
}
```

An example of a pointer 502 for a data bookmark 500 is provided below. The pointer 502 includes an access token 508 (access_token=6a43f8b1-92a1-4a25-bf0c-e039b65b03-c4):

https://api.squidsolutions.com/staging/v4.2/analytics/@'d-vdrental'.@bookmark:'57d04fcd2dbe0c568819efa7'/query?period=%27Rental_Date%27&timeframe=2005-10-0-8&timeframe=2015-10-31&compareTo=&compareTo=&filters=%27customer%27.%27address%27.%27Country%27%3D %22India%22&filters=&groupBy=% 27customer%27.%27address%27.%27Country%27&groupBy=%27-inventory%27.%27film%27.%27Title%27&groupBy=&-metrics=%27COUNT+rental%27&metrics=&orderBy=D-ESC%28%27COUNT+rental%27%29&orderBy=&limit=10&maxResults=100&startIndex=0&style=HTML&access_token=6a43f8b1-92a1-4a25-bf0c-*e*039b65b03c4

An example of a snippet 512 that corresponds to bookmark 500 is provided in FIG. 7.

An example of SQL code that corresponds to snippet 512 and bookmark 500 follows:

```
/*
computing KPI 'COUNT rental'
*/
SELECT
     -->customer >address Country (Dimension)
a5."country" AS "customer_address_country"
    ,
     -->inventory >film Title (Dimension)
a7."title" AS "inventory_film_title"
    ,
     -- COUNT rental (Metric)
COUNT(*) AS "count_rental"
FROM
     "public"."rental" a1
  LEFT OUTER JOIN "public"."customer" a2
  LEFT OUTER JOIN "public"."address" a3
  LEFT OUTER JOIN "public"."city" a4
  LEFT OUTER JOIN "public"."country" a5 ON
```

```
     (a5."country_id"=a4."country_id") ON
(a4."city_id"=a3."city_id") ON (a3."address_id"=a2."address_id") ON
(a2."customer_id"=a1."customer_id")
  LEFT OUTER JOIN "public"."inventory" a6
  LEFT OUTER JOIN "public"."film" a7 ON
     (a7."film_id"=a6."film_id") ON
(a6."inventory_id"=a1."inventory_id")
WHERE
     (-- filtering on: Rental_Date
(((CAST(a1."rental_date" AS DATE)>=DATE '2005-10-08' AND
CAST(a1."rental_date" AS DATE)<=DATE '2015-10-31'))))
     AND
     (-- filtering on: >customer >address Country
(a5."country"='India'))
GROUP BY a5."country" , a7."title"
ORDER BY
     "count_rental" DESC
LIMIT 5
```

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 204) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 204 optionally includes one or more storage devices remotely located from the CPU(s) 202. Memory 204, or alternatively the non-volatile memory device(s) within memory 204, comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

Communication systems as referred to herein (e.g., communication system 208) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for distributing a data bookmark, the method comprising:
    receiving, by an interface of a device that is secured in a private network, a scope definition, wherein the scope definition includes information that defines a scope of access to data stored by one or more databases that are secured in the private network, wherein the scope definition includes identifying information that identifies at least one column, table, or dimension of the one or more databases;
    generating a pointer for the data bookmark;
    generating the data bookmark using the pointer and the scope definition;
    storing, by the device that is secured in the private network, the generated data bookmark, wherein the generated data bookmark includes:
        the pointer for the data bookmark, and
        the scope definition that includes the identifying information that identifies the at least one column, table, or dimension of the one or more databases within the scope of access; and
    transmitting the pointer for the data bookmark to at least one remote device at a remote location that is outside of the private network.

2. The method of claim 1, wherein the scope definition includes information that indicates a portion, less than all, of the data stored by the one or more databases.

3. The method of claim 2, wherein the scope definition includes one or more filters that are available to be applied to the portion, less than all, of the data stored by the one or more databases.

4. The method of claim 1, wherein the scope definition includes information that indicates at least one value determined by performing at least one operation on the data stored by the one or more databases.

5. The method of claim 1, wherein the data bookmark includes application state information.

6. The method of claim 1, wherein the data bookmark includes information for displaying a snippet that is based on the scope of access to the data that is defined by the scope definition.

7. The method of claim 1, including:
    after transmitting the information about the generated data bookmark to the at least one remote device at the remote location that is not secured in the private network, receiving, by the user interface of the device that is secured in the private network, input that alters the scope definition;
    storing, by the device that is secured in the private network, a revised data bookmark that includes the altered scope definition; and transmitting the pointer for the revised data bookmark to the at least one remote device at the remote location that is outside of the private network.

8. The method of claim 1, including:
   storing, by the device that is secured in the private network, a plurality of data bookmarks that includes the generated data bookmark;
   receiving a request to provide a subset of data bookmarks from the plurality of data bookmarks that includes the generated data bookmark; and
   in response to the request, transmitting the subset of data bookmarks.

9. A system for distributing a data bookmark, the system comprising:
   one or more processors;
   memory; and
   one or more programs, wherein the one or more programs are stored in the memory and are configured to be executed by the one or more processors, the one or more programs including instructions for:
      receiving, by an interface of a device that is secured in a private network, a scope definition, wherein the scope definition includes information that defines a scope of access to data stored by one or more databases that are secured in the private network, wherein the scope definition includes identifying information that identifies at least one column, table, or dimension of the one or more databases;
      generating a pointer for the data bookmark;
      generating the data bookmark using the pointer and the scope definition;
      storing, by the device that is secured in the private network, the generated data bookmark, wherein the generated data bookmark includes:
         the pointer for the data bookmark, and
         the scope definition that includes the identifying information that identifies the at least one column, table, or dimension of the one or more databases within the scope of access; and
      transmitting the pointer for the data bookmark to at least one remote device at a remote location that is outside of the private network.

10. The system of claim 9, wherein the scope definition includes information that indicates a portion, less than all, of the data stored by the one or more databases.

11. The system of claim 10, wherein the scope definition includes one or more filters that are available to be applied to the portion, less than all, of the data stored by the one or more databases.

12. The system of claim 9, wherein the scope definition includes information that indicates at least one value determined by performing at least one operation on the data stored by the one or more databases.

13. The system of claim 9, wherein the data bookmark includes application state information.

14. The system of claim 9, wherein the data bookmark includes information for displaying a snippet that is based on the scope of access to the data that is defined by the scope definition.

15. The system of claim 9, wherein the one or more programs include instructions for:
   after transmitting the information about the generated data bookmark to the at least one remote device at the remote location that is not secured in the private network, receiving, by the user interface of the device that is secured in the private network, input that alters the scope definition;
   storing, by the device that is secured in the private network, a revised data bookmark that includes the altered scope definition; and
   transmitting the pointer for the revised data bookmark to the at least one remote device at the remote location that is outside of the private network.

16. The system of claim 9, wherein the one or more programs include instructions for:
   storing, by the device that is secured in the private network, a plurality of data bookmarks that includes the generated data bookmark;
   receiving a request to provide a subset of data bookmarks from the plurality of data bookmarks that includes the generated data bookmark; and
   in response to the request, transmitting the subset of data bookmarks.

17. A non-transitory computer readable storage medium storing one or more programs, the one or more programs comprising instructions, which when executed, cause a device that is secured in a private network to:
   receive, by an interface of the device that is secured in the private network, a scope definition, wherein the scope definition includes information that defines a scope of access to data stored by one or more databases that are secured in the private network, wherein the scope definition includes identifying information that identifies at least one column, table, or dimension of the one or more databases;
   generate a pointer for the data bookmark;
   generate the data bookmark using the pointer and the scope definition;
   store, by a device that is secured in the private network, the generated data bookmark, wherein the generated data bookmark includes:
      the pointer for the data bookmark, and
      the scope definition that includes the identifying information that identifies the at least one column, table, or dimension of the one or more databases within the scope of access; and
   transmit the pointer for the data bookmark to at least one remote device at a remote location that is outside of the private network.

18. The non-transitory computer readable medium of claim 17, wherein the scope definition includes information that indicates a portion, less than all, of the data stored by the one or more databases.

19. The non-transitory computer readable medium of claim 18, wherein the scope definition includes one or more filters that are available to be applied to the portion, less than all, of the data stored by the one or more databases.

20. The non-transitory computer readable medium of claim 17, wherein the scope definition includes information that indicates at least one value determined by performing at least one operation on the data stored by the one or more databases.

21. The non-transitory computer readable medium of claim 17, wherein the data bookmark includes application state information.

22. The non-transitory computer readable medium of claim 17, wherein the data bookmark includes information for displaying a snippet that is based on the scope of access to the data that is defined by the scope definition.

23. The non-transitory computer readable medium of claim 17 including instructions, which when executed, cause the device to:
   after transmitting the information about the generated data bookmark to the at least one remote device at the remote location that is not secured in the private network, receive, by the user interface of the device that is secured in the private network, input that alters the scope definition;

store, by the device that is secured in the private network, a revised data bookmark that includes the altered scope definition; and transmit the pointer for the revised data bookmark to the at least one remote device at the remote location that is outside of the private network.

24. The non-transitory computer readable medium of claim 17 including instructions, which when executed, cause the device to:

store, by the device that is secured in the private network, a plurality of data bookmarks that includes the generated data bookmark;

receive a request to provide a subset of data bookmarks from the plurality of data bookmarks that includes the generated data bookmark; and in response to the request, transmit the subset of data bookmarks.

* * * * *